United States Patent
Anton et al.

[11] 3,778,920
[45] Dec. 18, 1973

[54] FISHING BAIT RETAINER
[76] Inventors: Robert P. Anton; Vernon P. Anton, both of 5915 N.E. Almeda, Portland, Oreg. 97213
[22] Filed: Aug. 30, 1971
[21] Appl. No.: 175,953

[52] U.S. Cl. .............................................. 43/44.4
[51] Int. Cl. ........................................... A01k 83/06
[58] Field of Search................ 43/44.4, 44.2, 44.8, 43/42.37, 42.53, 44.89; 24/27, 28, 29, 16

[56] References Cited
UNITED STATES PATENTS
| | | | |
|---|---|---|---|
| 2,821,046 | 1/1958 | Fisk | 43/44.2 |
| 2,454,879 | 11/1948 | Mattingly | 43/44.8 |
| 2,480,042 | 8/1949 | Nelson | 43/44.4 |
| 2,520,654 | 8/1950 | Rants | 43/44.89 |

Primary Examiner—Warner H. Camp
Attorney—Kulisch, Hartwell & Dickinson

[57] ABSTRACT

An elongated plastically deformable wirelike device for securing and retaining bait on a fishing hook. The device has flattened opposite ends, either one of which may conveniently be folded and clamped about a fishing line at the location where such attaches to a hook. The remaining portion of the device, i.e., that which extends away from an end thus fastened to a line, may be wound tightly around the hook's shank, and around any bait on the hook, thus to anchor the bait to the shank.

6 Claims, 4 Drawing Figures

PATENTED DEC 18 1973  3,778,920

FISHING BAIT RETAINER

BACKGROUND AND SUMMARY OF THE INVENTION

This invention pertains to a device for securing and retaining bait, such as a cluster of salmon eggs, on a fishing hook.

A problem which recurrently confronts and frustrates fishermen is how satisfactorily to secure bait, such as that just mentioned, on a fishing hook. In many instances, and in the case of bait such as salmon eggs, it is ordinarily not enough simply to insert the hook into the bait and to rely on the hook alone to retain the bait. Obviously, bait which is improperly secured to a hook can easily come off the hook prematurely.

A general object of the present invention, therefore, is to provide a novel bait securing and retaining device for use in conjunction with a fish hook, which device solves the problem just mentioned in a practical and satisfactory manner.

More specifically, an object of the invention is to provide such a device which, when installed, will reliably hold bait on a hook-making accidental bait loss extremely unlikely.

Another object of the invention is to provide a device of the type so far generally described which readily lends itself to concealed installation.

Still another object of the present invention is to provide a bait securing and retaining device which is relatively inexpensive to use, and simple to install.

According to a preferred embodiment of the invention, the proposed device features an elongated slender wirelike element formed from a suitable plastically yieldable and deformable material. The device includes flattened bladelike end portions which join integrally with an elongated nonflattened central portion. The central portion has a smooth and nonangular outside surface, preferably with a substantially circular cross section.

When used, either one of the flattened ends of the device is folded and pinched (or clamped) about the outer end of a fishing line (at the location where such extends away from the shank in a hook). The central portion of the device is then tightly spirally wrapped around the shank and around any bait on the hook, thus to anchor the bait against the shank. The other end portion of the device is then inserted into the bait to conceal it.

This entire operation, which, it will be apparent, results in bait becoming securely attached to a hook, can be performed quite easily and very quickly. The securing device, when thus installed, in no way interferes with the normal handling characteristics of a baited hook, and in no way destroys the naturalness of the bait's appearance.

DESCRIPTION OF THE DRAWINGS

These and other objects and advantages attained by the invention will become more fully apparent as the description which follows is read in conjunction with the accompanying drawings, wherein.

DETAILED DESCRIPTION OF THE INVENTION

Figure 1:
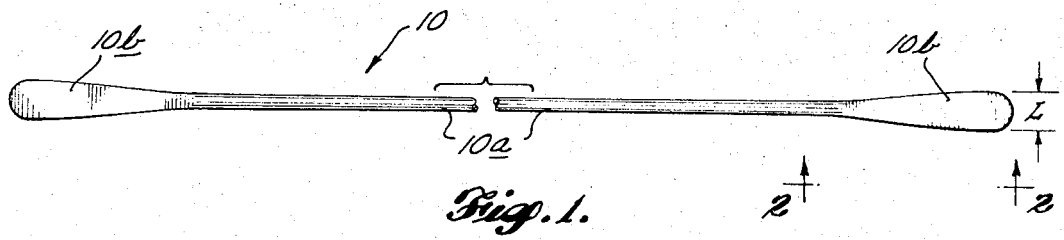
FIG. 1 is a side elevation illustrating a bait securing and retaining device as contemplated herein.
Figure 2:
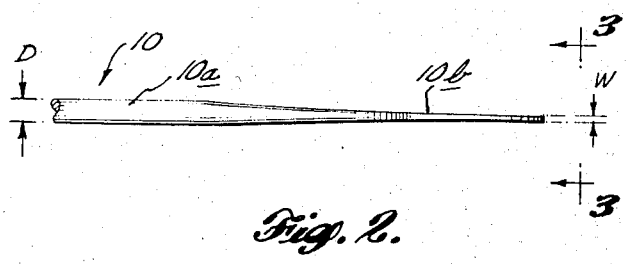
FIG. 2 is an enlarged fragmentary view taken generally along the line 2—2 in FIG. 1.
Figure 3:
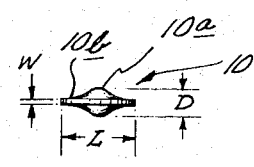
FIG. 3 is an end view taken along the line 3—3 in FIG. 2.

Turning now to the drawings, and referring first to FIGS. 1–3, inclusive, indicated generally at 10 is a fishing bait securing and retaining device constructed according to the present invention. Device 10 is a unitary structure including an elongated central portion 10a, opposite ends of which join with end portions 10b. Preferably, the device is formed from a suitable plastically yieldable and deformable material, such as soft annealed steel. As will be more fully explained herein, it is considered quite important that the particular material used to make device 10 be readily plastically deformable (in the sense that it can easily be manipulated and bent to different shapes) with the device tending (unless further deformed with sufficient force) to retain whatever shape or configuration it has been given.

As can be seen clearly in FIGS. 1, 2 and 3, the transverse cross-sectional configurations of the central and end portions in the device are different. More specifically, central portion 10a has what might be thought of as a nonflattened transverse cross section (preferably circular as shown), whereas end portions 10b have what might be thought of as flattened transverse cross sections. Referring particularly to FIG. 3 which shows the cross-sectional outlines of the central and an end portion of the device, it can be seen that the cross section of central portion 10a has a diameter D which is greater than the width W of the transverse cross section of an end portion 10b, and less than the length L of the latter-mentioned cross section.

While different particular dimensions may be employed in the device to suit different applications, a device which has been found to perform satisfactorily under most circumstances has an overall length of about 5 inches, with dimensions D, W and L being about 0.018-inches, 0.005-inches and 0.05-inches, respectively. The end portions may each be about one-eighth inch to about one-fourth inch long.

It will thus be apparent that the proposed device is relatively simple in construction, and can be manufactured relatively economically. For example, manufacture of a device may begin by cutting of the desired length of soft annealed steel wire having an appropriate diameter, such as 26-gage wire. Opposite ends of this cut length may then be suitably compressed to produce the flattened cross section end portions shown. Such are the steps which have actually been performed heretofore in manufacturing models of the device.

Figure 4:
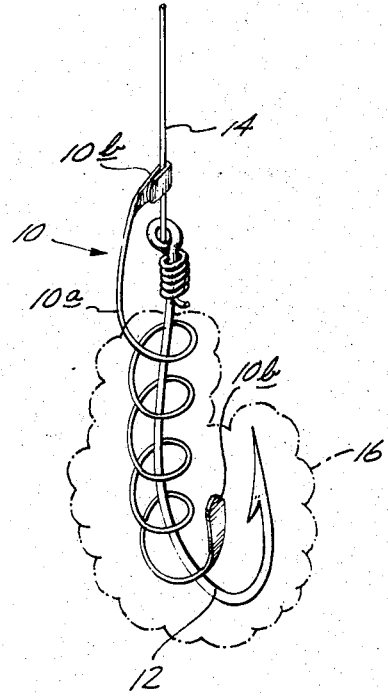
FIG. 4 is a view illustrating the device installed for use.

Turning now to FIG. 4, this illustrates the device in an installed condition with respect to a conventional fishing hook 12 which is tied onto the outer end of the usual fishing line 14. Bait, such as the cluster of salmon eggs shown in dashed outline at 16, is mounted on the hook, with the hook embedded in the egg cluster. Describing further what is shown in FIG. 4 by way of a description of an installation procedure, an end portion 10b of the device is folded around and pinched against fishing line 14, immediately adjacent where the line extends away from the upper end of the shank in hook 12. This end portion of the device thus becomes clamped, so-to-speak, to the fishing line. It will be apparent that the ready deformability of the material used in device 10, and the flattened cross section in the end portion, facilitate such an operation.

With egg cluster 16 mounted on and essentially surrounding hook 12, central portion 10a of the device is then tightly spirally wound around portions of the bait surrounding the shank. Under normal circumstances such a winding operation results in central portion 10a embedding itself in folds in the bait, without cutting the bait, with the result that the windings are concealed by the bait. The smooth and nonangular outside surface on portion 10a minimizes the chances of cutting into the bait. After such winding, the other end portion 10b is then suitably inserted into the bait to conceal it. The flattened cross section of the end portion facilitates such insertion.

After installation, it will be apparent that egg cluster 16 is securely attached to hook 12. The windings in device 10 firmly anchor the bait against the hook's shank, and the end portion of the device which is folded around the fishing line acts to prevent the device and bait from slipping axially along the hook.

Because the material in device 10 deforms plastically, manipulation of the device during installation is a relatively simple process. In other words, while the device can readily be deformed as desired to secure bait, it has sufficient stiffness to permit easy grasping during the installing procedure.

Obviously, with device 10 formed from a material such as that mentioned earlier, it will not under normal fishing conditions break or otherwise yield in a manner accidentally releasing the bait from the hook. Should the bait deteriorate after a period of time, it will be apparent that the same device can be used repeatedly.

Thus, it is believed apparent that the proposed securing and retaining device for fishing bait satisfactorily meets and solves the problem mentioned earlier.

While a preferred embodiment of the invention has been described herein, it is appreciated that variations and modifications may be made without departing from the spirit of the invention.

It is claimed and desired to secure by Letters Patent:

1. A wrapping device for binding bait on a fishing hook which is attached to a fishing line comprising
   an elongated slender plastically yieldable and deformable wrapping element,
   said element including an elongated end portion having along its length a flattened transverse cross section adapted for folding and clamping about such a line, and joined to and extending away from said end portion another portion having a transverse cross section with a configuration different from that of said first-mentioned transverse cross section.

2. A wrapping device for binding bait on a fishing hook which is attached to a fishing line comprising
   an elongated slender plastically yieldable and deformable wrapping element, said element including
   an elongated end portion defining one end of the element having along its length a flattened transverse cross section adapted for folding and clamping about such a line, and
   another portion joined to said end portion and extending therefrom toward the element's other end, said other portion having along its length a nonflattened transverse cross section.

3. The device of claim 2, wherein said element's said other portion is formed with a smooth and nonangular outside surface extending along its length.

4. The device of claim 2, wherein said transverse cross section of said element's said other portion is substantially circular.

5. The device of claim 4, wherein said flattened transverse cross section has a length greater than the diameter of said substantially circular transverse cross section, and a width less than such diameter.

6. In combination with a fishing hook having an elongated shank one end of which is attached to the outer end of an elongated fishing line, a device for securing bait on said hook comprising
   an elongated slender plastically yieldable and deformable element, said element including
   an elongated end portion definine one end of the element having along its length a flattened transverse cross section, said end portion being folded and clamped around said outer end of said line adjacent said shank, and
   another elongated portion joined to said end portion and extending away therefrom toward the other end of the element, said other portion having along its length a nonflattened transverse cross section and a smooth and nonangular outside surface, said other portion being adapted to be deformably and tightly wrapped around said shank and around any bait on said hook to pull such bait against the shank.

* * * * *

UNITED STATES PATENT OFFICE
CERTIFICATE OF CORRECTION

Patent No. 3,778,920      Dated December 18, 1973

Inventor(s) Robert F. Anton and Vernon R. Anton

It is certified that error appears in the above-identified patent and that said Letters Patent are hereby corrected as shown below:

On the cover sheet the inventor's names should read

--Robert F. Anton-- and --Vernon R. Anton--.

Signed and sealed this 16th day of April 1974.

(SEAL)
Attest:

EDWARD M. FLETCHER, JR.       C. MARSHALL DANN
Attesting Officer       Commissioner of Patents